United States Patent
Cierniak

(10) Patent No.: US 9,508,164 B2
(45) Date of Patent: Nov. 29, 2016

(54) FAST ITERATIVE IMAGE RECONSTRUCTION METHOD FOR 3D COMPUTED TOMOGRAPHY

(71) Applicant: CZESTOCHOWA UNIVERSITY OF TECHNOLOGY, Czestochowa (PL)

(72) Inventor: Robert Cierniak, Czestochowa (PL)

(73) Assignee: CZESTOCHOWA UNIVERSITY OF TECHNOLOGY, Czestochowa (PL)

( * ) Notice: Subject to any disclaimer, the term of this patent is extended or adjusted under 35 U.S.C. 154(b) by 0 days.

(21) Appl. No.: 14/162,065

(22) Filed: Jan. 23, 2014

(65) Prior Publication Data

US 2014/0205170 A1    Jul. 24, 2014

Related U.S. Application Data

(60) Provisional application No. 61/755,740, filed on Jan. 23, 2013.

(51) Int. Cl.
*G06K 9/00* (2006.01)
*G06K 9/36* (2006.01)
*G06T 11/00* (2006.01)

(52) U.S. Cl.
CPC ........ *G06T 11/006* (2013.01); *G06T 2211/424* (2013.01)

(58) Field of Classification Search
USPC ................................. 382/131, 280
See application file for complete search history.

(56) References Cited

U.S. PATENT DOCUMENTS 6,055,291 A * 4/2000 Hu ...................... G06T 11/005
378/15

6,944,260 B2    9/2005 Hsieh et al.
2009/0123048 A1 *  5/2009 Leroux ................ G06T 11/006
382/131
2011/0150308 A1    6/2011 Thibault et al.

(Continued)

FOREIGN PATENT DOCUMENTS

EP    2367153 A1    9/2011

OTHER PUBLICATIONS

Cierniak R., *A neural network optimization-based method of image reconstruction from projections*, the 2nd Asian Conference on Intelligent Information and Database Systems, 24-26.III.2010, Hue, Wietnam; Lecture Notes in Artificial Intelligence 5990, 241-250, Ed.: Nguyen N. T., Le M. T., and Świą tek J., Springer Verlag, 2010.

(Continued)

*Primary Examiner* — Kathleen Y Dulaney
(74) *Attorney, Agent, or Firm* — Horst M. Kasper

(57) ABSTRACT

This invention relates to a high resolution and low dosage tomographic imaging in three dimensions, and more particularly, to a fully analytical fast iterative statistical algorithm for image reconstruction from projections obtained in a spiral cone-beam x-ray scanner is described. The presented method allows to improve the resolution of the reconstructed images and/or to decrease the x-ray intensity while maintaining the quality of the obtained CT images, because the signals obtained are adapted to the specific statistics for this imaging technique. The location of pixels in a reconstructed image and the location of detectors in a detector array in this new approach are described. The topology of pixels and detectors presented here avoids an inconsistency in the distribution of the coefficients assigned to the pixels in the image, which appears in the formulation of the analytical iterative statistical reconstruction problem.

6 Claims, 14 Drawing Sheets

(56) References Cited

U.S. PATENT DOCUMENTS

| | | | |
|---|---|---|---|
| 2012/0051626 A1* | 3/2012 | Long | G06T 11/006 382/154 |
| 2012/0207370 A1* | 8/2012 | Fahimian | A61B 6/032 382/131 |
| 2013/0343673 A1* | 12/2013 | Pal | G06T 11/003 382/298 |

OTHER PUBLICATIONS

Cierniak R.: *A statistical tailored image reconstruction from projections method*, 2nd KES International Symposium on Intelligent Decision Technologies, 28-30.VII.2010; Baltimore; Advanced in Intelligent Decision Technologies, pp. 181-190, Ed.: Philips-Wren G., Jain L. C., Nakamatsu K., Howlett R. J., Springer-Verlag, Berlin, Heidelberg, 2010.

Cierniak R., *A statistical approach to image reconstruction from projections problem using recurrent neural network*, the 20th International Conference Artificial Neural Networks, 15-18.IX.2010, Thessaloniki, Grece; Lecture Notes in Computer Science 6353, pp. 138-141, Ed.: Diamantaras K., Duch W., Iliadis L. S., Springer Verlag, 2010.

Cierniak R., *An analytical statistical approach to the 3D reconstruction problem*, in Proc. of the 11th International Meeting on Fully Three-Dimensional Image Reconstruction in Radiology and Nuclear Medicine, Potsdam, 11-15.VII.2011, pp. 339-342.

Cierniak R., *Neural network algorithm for image reconstruction using the "grid-friendly" projections*, Springer: Australasian Physical & Engineering Sciences in Medicine, vol. 34, pp. 375-389, 2011.

G. N. Ramachandran, A. V. Lakshminarayanan, *Three-dimensional reconstruction from radiographs and electron micrographs: II. Application of convolutions instead of Fourier transforms*, Proc. Nat. Acad. Sci. of USA, vol. 68, pp. 2236-2240, 1971.

R. M. Lewitt, *Reconstruction algorithms: transform methods*, Proceeding of the IEEE, vol. 71, No. 3, pp. 390-408, 1983.

S. Kaczmarz, *Angeneaherte Aufloesung von Systemen Linearer Gleichungen*, Bull. Acad. Polon. Sci. Lett. A., vol. 35, pp. 355-357, 1937.

Y. Censor, *Finite series-expansion reconstruction methods*, Proceeding of the IEEE, vol. 71, No. 3, pp. 409-419, 1983.

K. Sauer, C. Bouman, *A local update strategy for iterative reconstruction from projections*, IEEE Transactions on Signal Processing, vol. 41, No. 3, pp. 534-548, 1993.

C. A. Bouman, K. Sauer, *A unified approach to statistical tomography using coordinate descent optimization*, IEEE Transactions on Image Processing, vol. 5, No. 3, pp. 480-492, 1996.

J.-B Thibault, K. D. Sauer, C. A. Bouman, J. Hsieh, *A three-dimensional statistical approach to improved image quality for multislice helical CT*, Medical Physics, vol. 34, No. 11, pp. 4526-4544, 2007.

R. Cierniak, *A novel approach to image reconstruction from projections using Hopfield-type neural network*, Lecture Notes in Artificial Intelligence 4029, pp. 890-898, Springer Verlag, 2006.

R. Cierniak, *A new approach to image reconstruction from projections problem using a recurrent neural network*, International Journal of Applied Mathematics and Computer Science, vol. 183, No. 2, pp. 147-157, 2008.

R. Cierniak, *A new approach to tomographic image reconstruction using a Hopfield-type neural network*, International Journal Artificial Intelligence in Medicine, vol. 43, No. 2, pp. 113-125, 2008.

R. Cierniak, *New neural network algorithm for image reconstruction from fan-beam projections*, Neurocomputing, vol. 72, pp. 3238-3244, 2009.

R. Cierniak, *A three-dimensional neural network based approach to the image reconstruction from projections problem*, Lecture Notes in Artificial Intelligence 6113, S. 505-514, Springer Verlag, 2010.

R. Cierniak, *X-Ray Computed Tomography in Biomedical Engineering*, Springer, London, 2011.

\* cited by examiner

FAST ITERATIVE IMAGE RECONSTRUCTION METHOD FOR 3D COMPUTED TOMOGRAPHY

REFERENCES CITED

U.S. Patent Documents

| | | | |
|---|---|---|---|
| 6,944,260 | B2 | September 2005 | Hsieh et al. |
| 2011/0150308 | A1 | June 2011 | Thibault et. al. |

Foreign Patent Documents

| | | | |
|---|---|---|---|
| EP2367153 | A1 | September 2011 | Hsieh |

Other Publications

[1] G. N. Ramachandran, A. V. Lakshminarayanan, *Three-dimensional reconstruction from radiographs and electron micrographs: II. Application of convolutions instead of Fourier transforms*, Proc. Nat. Acad. Sci. of USA, vol. 68, pp. 2236-2240, 1971.
[2] R. M. Lewitt, *Reconstruction algorithms: transform methods*, Proceeding of the IEEE, vol. 71, no. 3, pp. 390-408, 1983.
[3] S. Kaczmarz, *Angeneaherte Aufloesung von Systemen Linearer Gleichungen*, Bull. Acad. Polon. Sci. Lett. A., vol. 35, pp. 355-357, 1937.
[4] Y. Censor, *Finite series-expansion reconstruction methods*, Proceeding of the IEEE, vol. 71, no. 3, pp. 409-419, 1983.
[5] K. Sauer, C. Bouman, *A local update strategy for iterative reconstruction from projections*, IEEE Transactions on Signal Processing, vol. 41, No. 3, pp. 534-548, 1993.
[6] C. A. Bouman, K. Sauer, *A unified approach to statistical tomography using coordinate descent optimization*, IEEE Transactions on Image Processing, vol. 5, No. 3, pp. 480-492, 1996.
[7] J.-B Thibault, K. D. Sauer, C. A. Bouman, J. Hsieh, *A three-dimensional statistical approach to improved image quality for multislice helical CT*, Medical Physics, vol. 34, No. 11, pp. 4526-4544, 2007.
[8] R. Cierniak, *A novel approach to image reconstruction from projections using Hopfield-type neural network*, Lecture Notes in Artificial Intelligence 4029, pp. 890-898, Springer Verlag, 2006.
[9] R. Cierniak, *A new approach to image reconstruction from projections problem using a recurrent neural network*, International Journal of Applied Mathematics and Computer Science, vol. 183, No. 2, pp. 147-157, 2008.
[10] R. Cierniak, *A new approach to tomographic image reconstruction using a Hopfield-type neural network*, International Journal Artificial Intelligence in Medicine, vol. 43, No. 2, pp. 113-125, 2008.
[11] R. Cierniak, *New neural network algorithm for image reconstruction from fan-beam projections*, Neurocomputing, vol. 72, pp. 3238-3244, 2009.
[12] R. Cierniak, *A three-dimensional neural network based approach to the image reconstruction from projections problem*, Lecture Notes in Artificial Intelligence 6113, S. 505-514, Springer Verlag, 2010.
[13] R. Cierniak, *X-Ray Computed Tomography in Biomedical Engineering*, Springer, London, 2011.

TECHNICAL FIELD

This invention relates to three dimensional imaging, and particularly to the high resolution and low dosage three dimensional tomographic imaging.

BACKGROUND OF THE INVENTION

Analytical methods are one of the most important approaches to the image reconstruction from projections problem (see e.g. [1] G. N. Ramachandran, A. V. Lakshminarayanan, *Three-dimensional reconstruction from radiographs and electron micrographs: II. Application of convolutions instead of Fourier transforms*, Proc. Nat. Acad. Sci. of USA, vol. 68, pp. 2236-2240, 1971, [2] R. M. Lewitt, *Reconstruction algorithms: transform methods*, Proceeding of the IEEE, vol. 71, no. 3, pp. 390-408, 1983). Another major category of reconstruction method is the algebraic reconstruction technique (ART) (see e.g. [3] S. Kaczmarz, *Angeneaherte Aufloesung von Systemen Linearer Gleichungen*, Bull. Acad. Polon. Sci. Lett. A., vol. 35, pp. 355-357, 1937, [4] Y. Censor, *Finite series-expansion reconstruction methods*, Proceeding of the IEEE, vol. 71, no. 3, pp. 409-419, 1983). All of the recent practically applicable reconstruction algorithms can be classified as belonging to one of these two methodologies of image reconstruction.

In conventional tomography, analytical algorithms, especially those based on convolution and back-projection strategies of image processing, are the most popular. Algebraic algorithms are much less popular because algebraic reconstruction problems are formulated using matrices with very large dimensionality. Thus algebraic reconstruction algorithms are much more complex than analytical methods.

Recently, there have been some new concepts regarding reconstruction algorithms. Among these new ideas, the statistical approach to image reconstruction is preferred (see e.g. [5] K. Sauer, C. Bouman, *A local update strategy for iterative reconstruction from projections*, IEEE Transactions on Signal Processing, vol. 41, No. 3, pp. 534-548, 1993, [6] C. A. Bouman, K. Sauer, *A unified approach to statistical tomography using coordinate descent optimization*, IEEE Transactions on Image Processing, vol. 5, No. 3, pp. 480-492, 1996). This concept has been adapted for three-dimensional multi-slice helical computed tomography (see e.g. [7] J.-B Thibault, K. D. Sauer, C. A. Bouman, J. Hsieh, *A three-dimensional statistical approach to improved image quality for multi-slice helical CT*, Medical Physics, vol. 34, No. 11, pp. 4526-4544, 2007) as the iterative coordinate descent (ICD) approach. In the ICD algorithm, the reconstruction process is performed using the maximum a posteriori probability (MAP) approach formulated principal as an algebraic reconstruction problem. This methodology is presented in the literature as being more robust and flexible than analytical inversion methods because it allows for accurate modeling of the statistics of projection data.

The present applicant furnishes a new statistical approach to the image reconstruction problem, which is consistent with the analytical methodology of image processing during the reconstruction process. The preliminary conception of this kind of image reconstruction from projections strategy is represented in the literature only in the original works published by the present applicant for parallel scanner geometry (see e.g. [8] R. Cierniak, *A novel approach to image reconstruction from projections using Hopfield-type neural network*, Lecture Notes in Artificial Intelligence 4029, pp. 890-898, Springer Verlag, 2006, [9] R. Cierniak, *A new approach to image reconstruction from projections problem using a recurrent neural network*, International Journal of Applied Mathematics and Computer Science, vol. 183, No. 2, pp. 147-157, 2008, or [10] R. Cierniak, *A new approach to tomographic image reconstruction using a Hopfield-type neural network*, International Journal Artificial Intelligence in Medicine, vol. 43, No. 2, pp. 113-125, 2008), for fan-beam geometry (see e.g. [11] R. Cierniak, *New neural network algorithm for image reconstruction from fan-beam projections*, Neurocomputing, vol. 72, pp. 3238-3244, 2009) and for spiral cone-beam tomography (see e.g. [12] R. Cierniak, *A three-dimensional neural network based approach to the image reconstruction from projections problem*, Lecture Notes in Artificial Intelligence 6113, S. 505-514, Springer Verlag, 2010). In all these algorithms the reconstruction problem for any geometry of scanner is reformulated to the parallel-beam reconstruction problem using a re-binning operation. Thanks to the analytical origins of the reconstruction method proposed in the above documents, most of the above-mentioned difficulties connected with using ART methodology can be avoided.

BRIEF DESCRIPTION OF THE INVENTION

Although the proposed reconstruction method has to establish certain coefficients, this can be performed in a much easier way than in comparable methods. Additionally, it need only be done in one plane in 2D space, thus simplifying the problem. In this way, the reconstruction process can be performed for every cross-section image separately, allowing the collection of the whole 3D volume image from a set of previously reconstructed 2D images. Moreover, the optimization criterion used in this approach depends on an imposed loss function. And, what is most important, a modification of this function has been proposed so as to limit the analytical statistical model to the maximum likelihood (ML) scheme, thus preventing any instabilities in the reconstruction process. But firstly, it was necessary to formulate a reconstruction problem suitable for the analytical methodology of reconstructed image processing. The problem as formulated by the applicant of this application can be defined as an approximate discrete 2D reconstruction problem (see e.g. [11] R. Cierniak, *New neural network algorithm for image reconstruction from fan-beam projections*, Neurocomputing, vol. 72, pp. 3238-3244, 2009). It takes into consideration a form of the interpolation function used in back-projection. The form of the analytical statistical reconstruction problem proposed by the applicant of this application is very compact. All the geometrical conditions of the projections and the frequency operations performed on the reconstructed image fit into a matrix of coefficients.

A method for reconstructing an image of an examined object of a spiral computed tomographic scan comprises establishing a radiation source, establishing a detector array, calculating coefficients $h_{\Delta i, \Delta j}$, performing a scanning of an examined object by using a spiral computed tomographic imaging system to obtain a projection dataset, and performing of a back-projection operation for a fixed cross-section of an examined object wherein projections are used in the back-projection operation in a direct way. The coefficients $g_{i,j}$ are calculated and an initial image for an iterative reconstruction process is calculated and the iterative reconstruction process is performed.

A 2D FFT is performed of the reconstructed image. The multiplication of the elements of the frequency representation of the reconstructed image by corresponding elements of the matrix $H_{k,l}$ is performed. A 2D IFFT of the resulting matrix is performed. Every pixel of the image obtained as the result of the above operations is performed by a non-linear function. The 2D FFT of the resulting matrix is performed. A multiplication of elements of a frequency representation of the resulting matrix is performed by corresponding elements of the matrix $H_{k,l}$. The 2D IFFT of the resulted matrix is performed. A correction of the reconstructed image is performed. A criterion of an iterative process for stopping is performed.

No geometric correction of projections obtained from the spiral computed tomographic scanner is performed.

Coefficients $h_{\Delta i, \Delta j}$ used in the iterative reconstruction process are established according to the relation:

$$h_{\Delta i, \Delta j} = (\Delta_s)^2 \Delta_h \sum_\theta \mathrm{Int}(|\Delta i| \cdot \Delta_s \cos(\theta \cdot \Delta_\alpha) + |\Delta j| \cdot \Delta_s \sin(\theta \cdot \Delta_\alpha))$$

wherein $\Delta i$ ($\Delta j$) is the difference between the index of a pixel in the reconstructed image in the x direction (y direction); $\Delta_s$ is a distance between pixels in a reconstructed image; Int is an interpolation function used in the back-projection operation; $\Delta_\alpha$ is an angular raster between angles of projections; $\theta = 1, \ldots, \Theta_{max}$ is an index of the angles, where $\Delta_\alpha \cdot \Theta_{max} = 2\pi$.

The method in accordance with claim 1 wherein coefficients $g_{i,j}$ used in the iterative reconstruction process are established according to the relation $$g_{i,j} = \sqrt{\sum_\theta \sum_\eta \sum_k w_{ij,\beta}^2 v_{ij,k}^2 e^{p^h(\beta_\eta, \alpha_\theta^h, \dot{z}_k)}},$$

wherein $p^h(\beta_\eta, \alpha_\theta^h, \dot{z}_k)$ are projections used in the back-projection operation for a specific pixel of the reconstructed image (this pixel is indicated by the pair (i, j)); $w_{ij,\eta}$ and $v_{ij,k}$ are calculated weights assigned to the projections used in the back-projection operation for a specific pixel (i, j) in the reconstructed image.

A plane is oriented, an image is placed in the plane by a coordinate system (x, y), and the topology of the pixels in the reconstructed image is placed according to the following description:

$$x = \ldots, -\frac{5\Delta_s}{2}, -\frac{3\Delta_s}{2}, -\frac{\Delta_s}{2}, \frac{\Delta_s}{2}, \frac{3\Delta_s}{2}, \frac{5\Delta_s}{2}, \ldots,$$

for the x direction, and $$y = \ldots, -\frac{5\Delta_s}{2}, -\frac{3\Delta_s}{2}, -\frac{\Delta_s}{2}, \frac{\Delta_s}{2}, \frac{3\Delta_s}{2}, \frac{5\Delta_s}{2}, \ldots$$

for the y direction, where $\Delta_s$ is a raster of pixels in the reconstructed image, for both x and y directions.

In the method, according to the present invention, the placement of the x-ray detectors in every column of the detector array is specified by the following description:

$$\beta_\eta = (\eta - H_s - 0.5) \cdot \Delta_\beta$$

where $\Delta_\beta$ is the angular distance between the radiation detectors in columns of the detector array; $H_s$ is a positive integer value denoting number of detectors in columns; $\eta$ is an index of detectors in columns.

The transformation by a nonlinear function can be performed using the following relation $$b_{i,j}^t = g_{i,j} \cdot \tanh\left(\frac{a_{i,j}^t - \tilde{\mu}_{i,j}}{\lambda}\right)$$

wherein $a_{i,j}^t$ is a pixel from the transformed image; $g_{i,j}$ is a coefficient established for a given pixel (i, j); $\tilde{\mu}_{i,j}$ is a value of the pixel from the image obtained after back-projection operation; $\lambda$ is a constant slope coefficient.

DETAILED DESCRIPTION OF THE INVENTION

Figure 1:
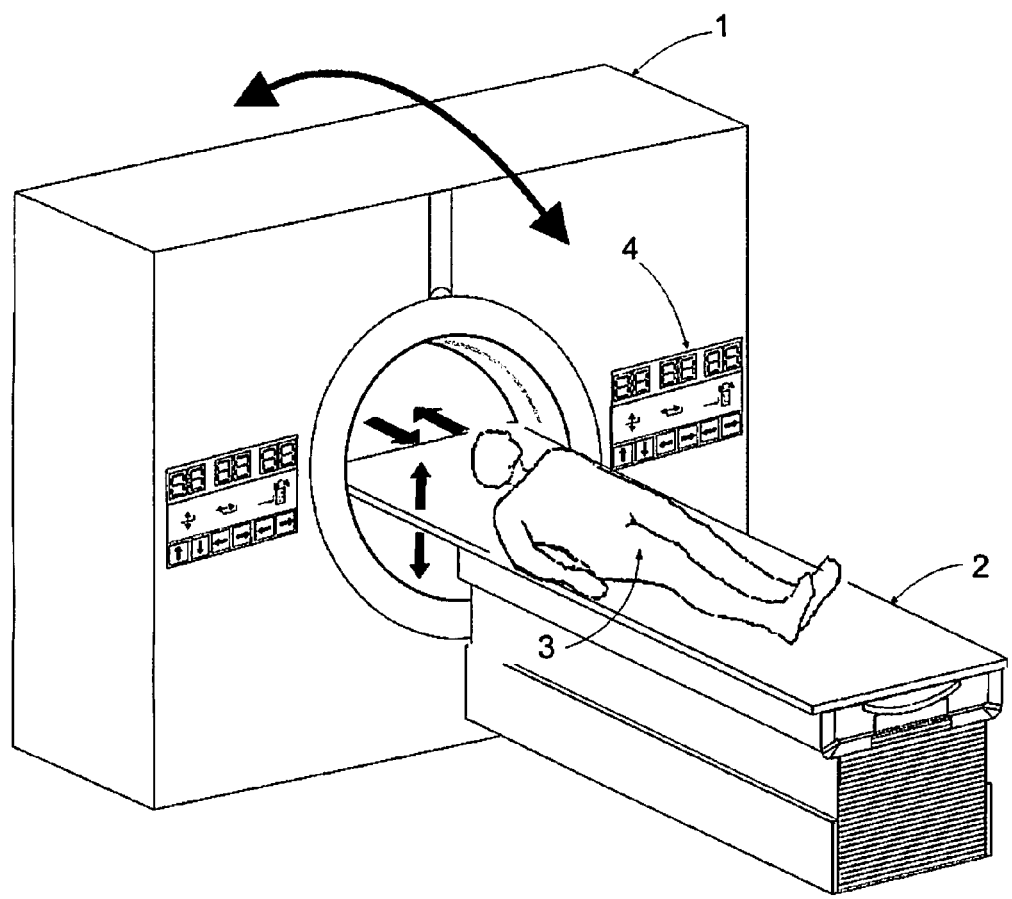
FIG. 1 shows a general view of a tomographic device.
Figure 2:
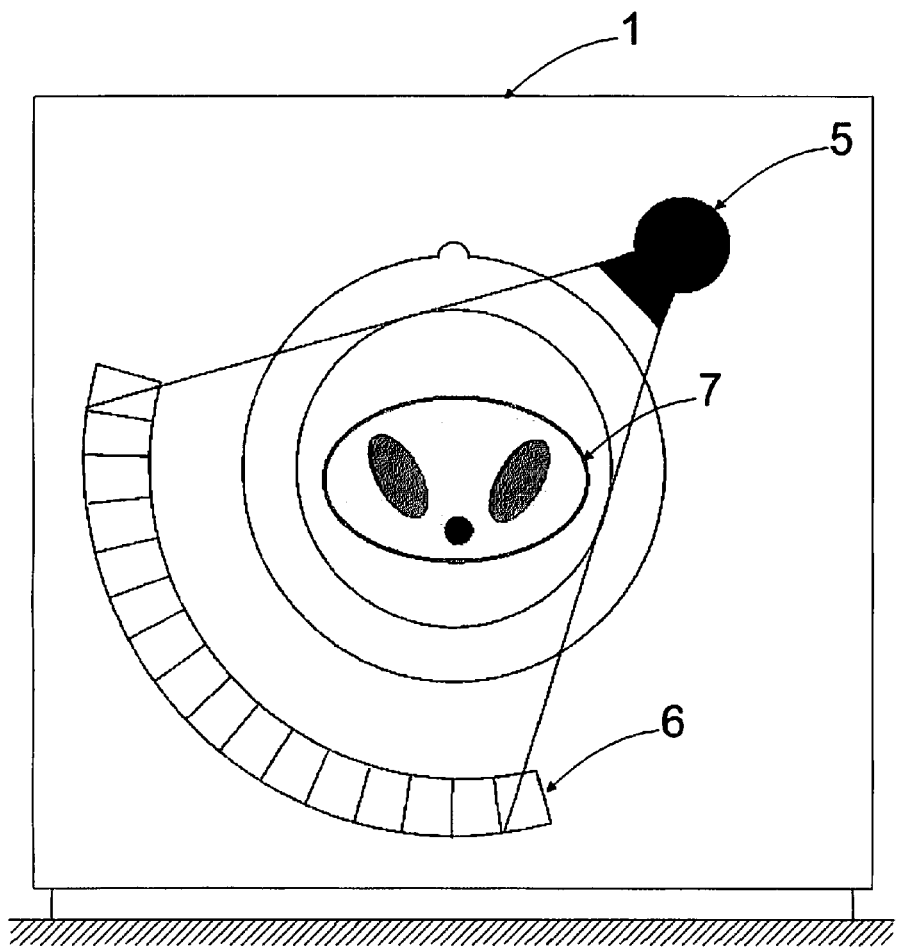
FIG. 2. shows the geometry of the scanner in the gantry.
Figure 3:
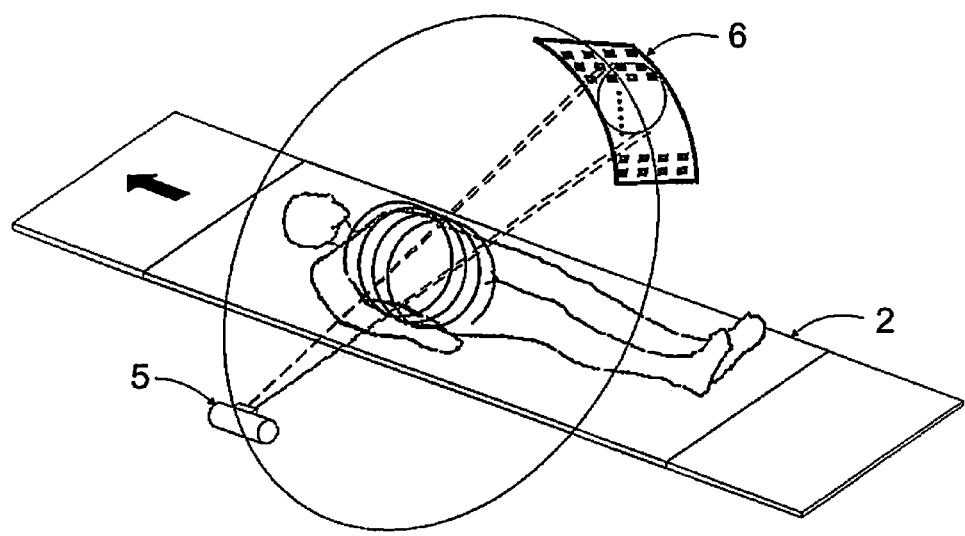
FIG. 3 illustrates the movement of the projection system relative to the patient in the spiral scanner with the cone beam.
Figure 4:
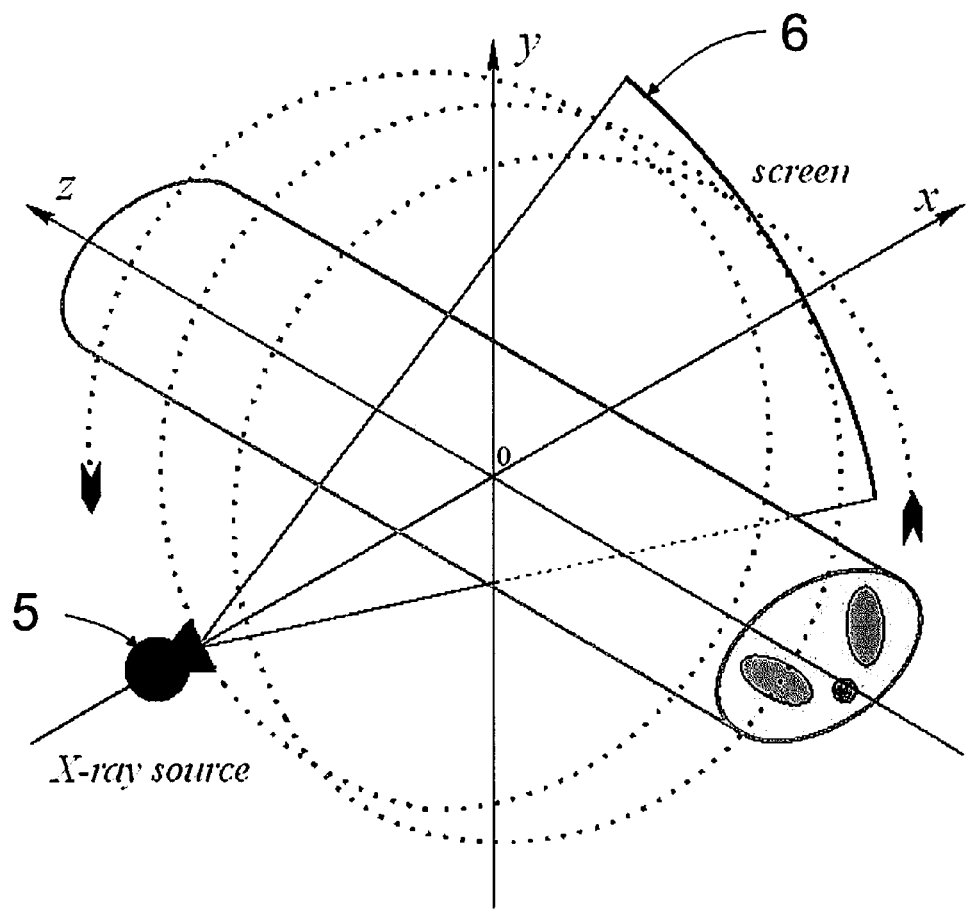
FIG. 4 depicts a projection system of a cone-beam scanner in a three-dimensional perspective view.
Figure 5:
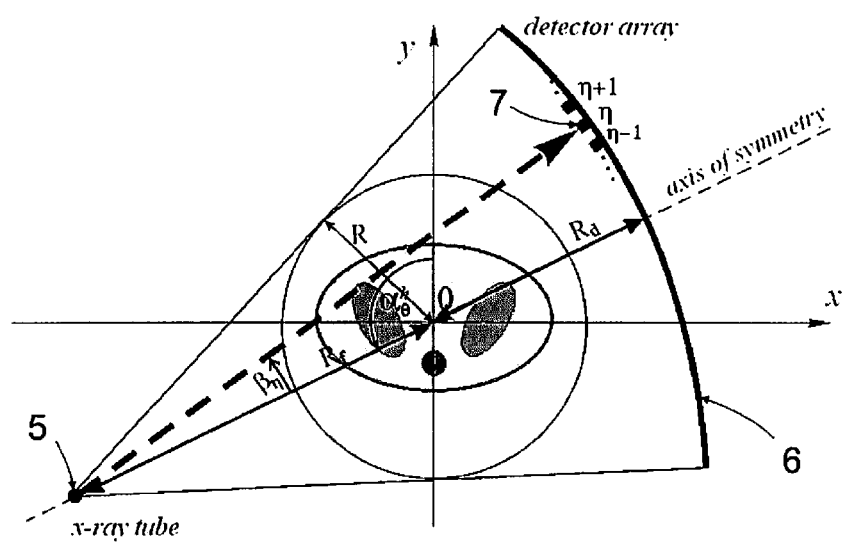
FIG. 5 shows the geometry of a cone-beam projection system in a plane perpendicular to the axis of rotation.
Figure 6:
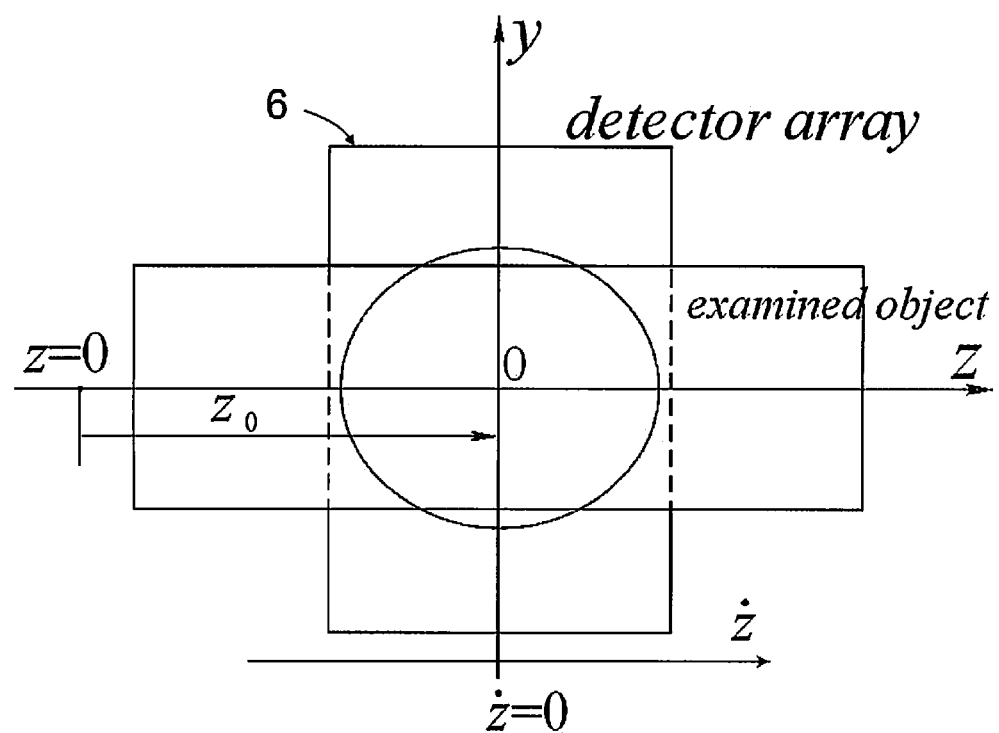
FIG. 6 shows the location of a test object in a plane along the axis of rotation of the projection system.

FIG. 1 shows a general scheme of the spiral tomography apparatus, which consists of three main parts: gantry 1, table 2 (on which an examined patient 3 is placed), and a computer (which is used to control the whole device and to perform the reconstruction procedure). The here described image reconstruction method is carried out using projections based on measurements performed by a measuring system installed in the gantry 1. Every measurement is obtained thanks to the measuring circuit (see FIG. 2): x-ray tube 5 and detector placed on the screen in the detector array 6. The examined cross-section of the patient 7 is placed inside the gantry. The reconstruction method of the present invention is dedicated for the x-ray apparatus with a spiral movement trace of the measurement system (called also a scanner) and with a cone shaped beam of x-rays. This type of scanner is well-known in tomography technology, and is used commonly in practice (see for example U.S. Pat. No. 6,944,260, US Patent Application Publication 2011/0150308 and European Patent EP2367153). FIG. 3 depicts the movement of the parts of the measurement system relative to the patient. FIG. 4 depicts the general view of the geometry of a spiral cone-beam scanner used in the present invention. This drawing shows the projection system of a cone-beam scanner oriented by x-y-z coordinates in a three-dimensional perspective view. This construction of scanners combines the movement of the x-ray tube 5 around the patient with a simultaneous displacement of the table 2 with a patient. In consequence, the measurement system moves in a spiral around the patient. The x-ray beam takes the form of a cone and reaches a detector array 6. During a scan, this assembly rotates around the z-axis, which is the principal axis of the system. This construction permits three-dimensional projection techniques to be mastered and so paved the way for the development of reconstruction techniques operating in three dimensions. FIG. 5 depicts the geometry of the cone-beam scanner in a plane perpendicular to the axis of rotation z; FIG. 6 shows the location of the examined body in the plane along the axis of rotation of the measurement system. Every measurement registers x-ray intensity by a detector placed on the screen at a specific position of the rotated measurement system. These direct measurements are transformed by a nonlinear function into variables called projections, as follows:

$$p = \ln\frac{I_0}{I}, \quad (1)$$

wherein: I is a measured x-ray intensity; $I_0$ is an x-ray intensity emitted by the tube.

Not all possible measurements are performed. The parameters of the carried out projections obtained through the scanner can be defined as it is presented below.

At a given moment, assuming that the tube rotating around the examined object starts at a projection angle $\alpha^h=0$, the vertical plane of symmetry of the projection system moves along the z-axis and its current location along this axis (see FIG. 6) is defined by the relationship:

$$z_0 = \lambda\frac{\alpha^h}{2\pi}, \quad (2)$$

where: $\lambda$ is the relative travel of the spiral described by the tube around the test object, measured in $$\left[\frac{m}{\text{rad}}\right].$$

Each x-ray ray emitted at a particular angle of rotation $\alpha^h$ and reaching any of the detectors 7 placed in the detector array 6 can be identified by measurement parameters ($\beta_\eta$, $\alpha_\theta^h$, $\dot{z}_k$), wherein:

$\beta_\eta$ is the angle between a particular ray in the beam and the axis of symmetry of the moving measurement system ($\eta0$ is a number of detectors in a particular column of the detector array 6 (see FIG. 5));

$\alpha_\theta^h$ is the angle at which the projection is made (using all detectors the measurements are performed), i.e. the angle between the axis of symmetry of the rotated scanner and the y-axis;

$\dot{z}_k$ is the z-coordinate position relative to the current position of the moving measurement system (k is a detector number in a particular row of the detector array 6 (see FIG. 6)).

The acquisition of the projection values $p^h(\beta_\eta, \alpha_\theta^h, \dot{z}_k)$ only takes place at specific angles of rotation $\alpha^h$:

$$\alpha_\theta^h = \theta \cdot \Delta_\alpha^h$$

wherein: $\Delta_\alpha^h = 2\pi/\Theta^{2\pi}$ is the angle through which the scanner is rotated following each projection; $\Theta^{2\pi}$ is the number of projections made during one full rotation of the scanner; $\theta=0, \ldots, \Theta-1$ is the global projection index; $\Theta=\text{number\_of\_rotations} \cdot \Theta^{2\pi}$ is the total number of projections.

The position of a detector in the array placed on the cylindrically shaped screen is determined by the pair $(\eta, k)$, where $\eta=0, \ldots, H-1$ is index of the detector in every column (it is called a channel) and $k=0, \ldots, K-1$ is the index of the column (it is called a row). H and K denote the total number of detectors in the channels and the total number of rows, respectively.

The useful rays are striking the detectors in the individual rows. These detectors are distributed evenly. Thus, we can write:

$$\beta_\eta = (\eta - H_s - 0.5) \Delta_\beta, \quad (4)$$

wherein: $\Delta_\beta$ is the angular distance between the radiation detectors on the cylindrical screen; $H_s$ is a positive integer value (it is convenient to assume, if H is an even value, that $H_s = H/2$). The shift by an angle $0.5 \cdot \Delta_\beta$ is claimed in this application.

We can write, too:

$$\gamma_k = (k - K_s) \cdot \dot{\Delta}_z, \quad (5)$$

wherein: we assume that detectors are equidistantly placed in every channel and $\dot{\Delta}_z$ is the distance between detectors in channels related to the z-axis; $K_s$ is a positive value (it is convenient to assume, if K is an odd value, that $K_s = (K-1)/2$).

Figure 7:
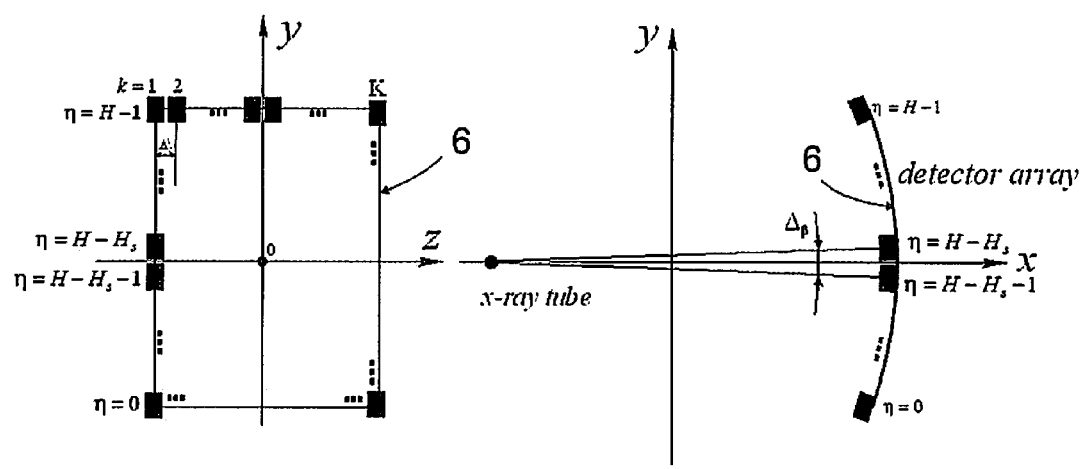
FIG. 7 depicts the topology of the detectors on a cylindrically-shaped screen (at the projection angle $\alpha^h=\pi/2$)

Above assumptions make it easy to locate the detectors in the array on the surface of the partial cylinder, as shown in FIG. 7.

Before the reconstruction method is applied, the center of reconstructed cross-section is chosen by an operator, and will be assigned as $z_p$. X-ray tube 5 reaches this point when it is at an angle (if the tube rotating around the examined object starts at a projection angle $\alpha^h=0$):

$$\alpha_p^h = z_p \frac{2\pi}{\lambda}. \quad (6)$$

Next, all projections $p^h(\beta_\eta, \alpha_\theta^h, \dot{z}_k)$ necessary for a reconstruction method are obtained using measurements of x-ray intensity performed by the helical cone-beam scanner. It is needed for a reconstruction of the cross-section with a center located at the position $z_p$ to collect all projections from a range $\alpha_p^h - \pi \leq \alpha_\theta^h \leq \alpha_p^h + \pi$ and some projections outside this range next to the values $\alpha^h = \alpha_p^h - \pi$ and $\alpha^h = \alpha_p^h + \pi$ (because of a requirement of an interpolation operation in the further steps of the reconstruction procedure).

Having all necessary projection values $p^h(\beta_\eta, \alpha_\theta^h, \dot{z}_k)$, the reconstruction algorithm 8 can be started, as specified in the following steps.

Step 1.

Figure 8:
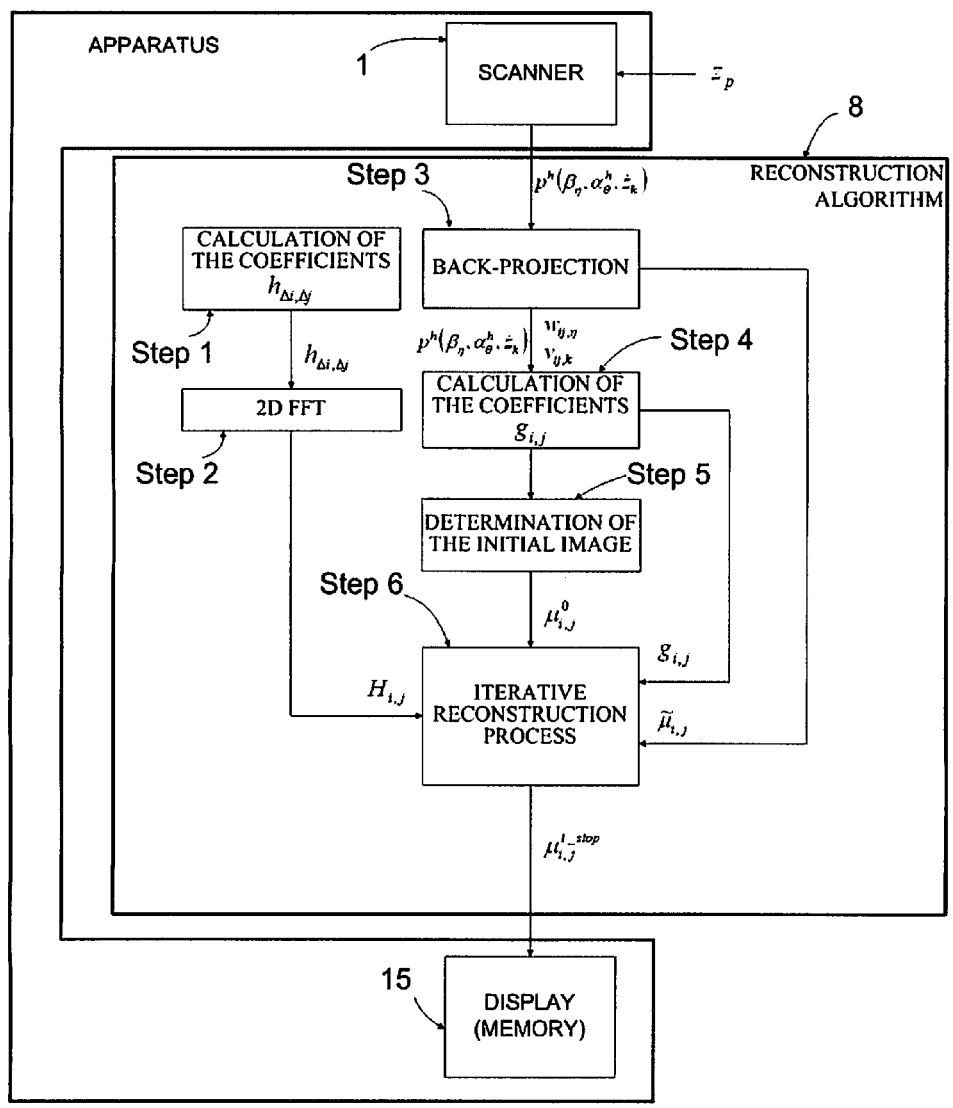
FIG. 8 depicts a schematic block diagram of a method used to practice the present invention with connection to a computed tomography apparatus.

Before the main reconstruction procedure is started, the $h_{\Delta i, \Delta j}$ coefficient matrix is established (see FIG. 8). All calculations in this step of the presented reconstruction procedure can be pre-calculated, i.e. the calculation can be carried out before the scanner performs all necessary measurements. We make a simplification in that the coefficients $h_{\Delta i, \Delta j}$ are the same for all pixels of the reconstructed image, and they can be calculated in a numerical way, as follows:

$$h_{\Delta i, \Delta j} = (\Delta_s)^2 \Delta_\alpha \sum_\theta \text{Int}(|\Delta i| \cdot \Delta_s \cos(\theta \cdot \Delta_\alpha) + |\Delta j| \cdot \Delta_s \sin(\theta \cdot \Delta_\alpha)), \quad (7)$$

where: $\Delta i$ ($\Delta j$) is the difference between the index of pixels in the x direction (y direction); $\Delta_s$ is a distance between pixels in a reconstructed image; $\Delta_\alpha$ is a raster of angles ($\Delta_\alpha$ is many times less than $\Delta_\alpha^h$, for instance 1000 times);

$$\theta = 0, 1, \ldots, \frac{2\pi}{\Delta_\alpha} - 1;$$

Int is an interpolation function.

In general, the interpolation function Int can be any interpolation function. In this application, it is the ordinary linear interpolation function, which is expressed in the following way $$\text{Int}(\Delta) = \begin{cases} \frac{1}{\Delta_s}\left(1 - \frac{|\Delta|}{\Delta_s}\right) & \text{for } |\Delta| \leq \Delta_s \\ 0 & \text{for } |\Delta| > \Delta_s \end{cases}. \quad (8)$$

Figure 9:
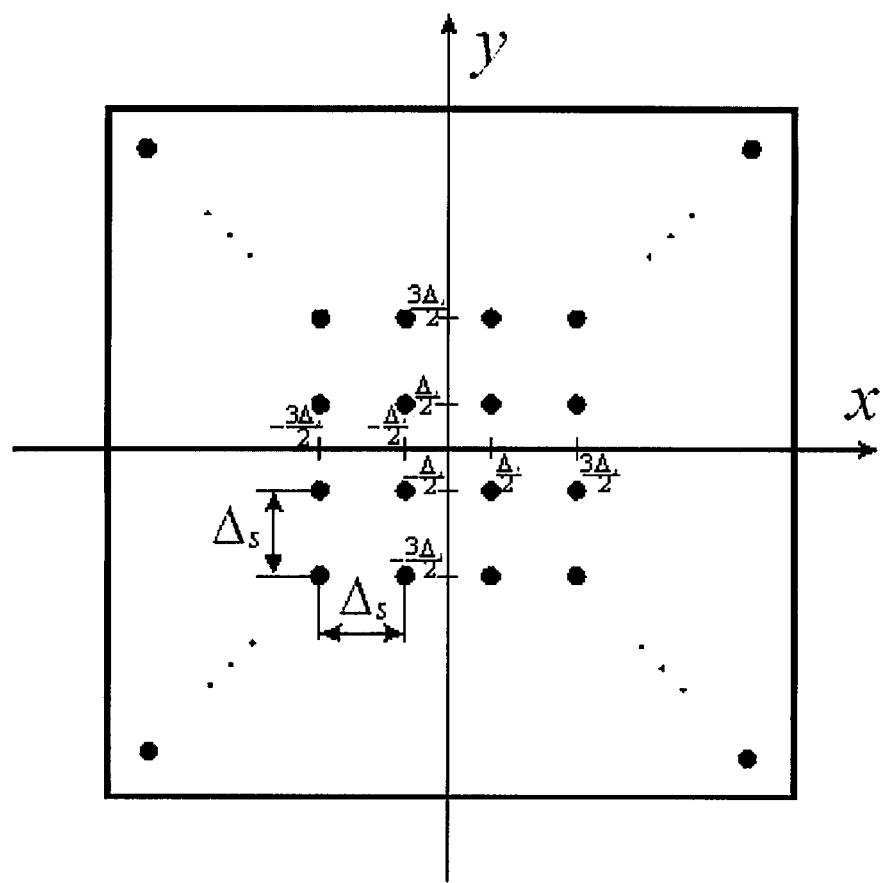
FIG. 9 illustrates schematically a proposed topology of the pixels in the reconstructed image.

The invention presented here relates also to the technical problem of how to avoid the consequences of the central pixel in the reconstructed image being preferred over other pixels during the calculation of coefficients $h_{\Delta i, \Delta j}$ performed in Step 1. Because a relation (7) prefers the central point of the (x,y) coordinate system, the pixel lying at this point is also preferred over other pixels. This is because it is only at the point lying at the origin of the coordinate system that the interpolation function gets the value 1 at every angle $\theta \cdot \Delta_\alpha$. In this application, to avoid the consequences of this preference for the central pixel in the reconstructed image during the calculation of coefficients $h_{\Delta i, \Delta j}$ the topology of the pixels in a reconstructed image presented in FIG. 9 is proposed, to avoid the situation when any pixel is placed in a central point of a reconstructed image. These pixels are placed in this image according to the following description:

$$x = \ldots, -\frac{5\Delta_s}{2}, -\frac{3\Delta_s}{2}, -\frac{\Delta_s}{2}, \frac{\Delta_s}{2}, \frac{3\Delta_s}{2}, \frac{5\Delta_s}{2}, \ldots \quad (9)$$

$$= \frac{-I}{2} - 0.5, \ldots, -0.5, 0.5, \ldots, \frac{I}{2} - 0.5,$$

for the x direction, and $$y = \ldots, -\frac{5\Delta_s}{2}, -\frac{3\Delta_s}{2}, -\frac{\Delta_s}{2}, \frac{\Delta_s}{2}, \frac{3\Delta_3}{2}, \frac{5\Delta_s}{2}, \ldots \quad (10)$$

$$= \frac{-I}{2} - 0.5, \ldots, -0.5, 0.5, \ldots, \frac{I}{2} - 0.5$$

for the y direction, if a reconstructed image has dimensions I×I (I is chosen to be equal to a positive integer power of 2).

Output for this step is a matrix of the coefficients $h_{\Delta i,\Delta j}$. If a reconstructed image has dimensions I×I then this matrix has dimensions 2I×2I.

Step 2.

In this step the matrix of the coefficients $h_{\Delta i,\Delta j}$ is transformed into a frequency domain using a 2D FFT transform (see FIG. 8). All calculations in this step of the presented reconstruction procedure can be pre-calculated, i.e. it can be carried out before the scanner performs all necessary measurements.

Output for this step is a matrix of the coefficients $H_{k,l}$ with dimensions 2I×2I.

Step 3.

The essential part of the invented reconstruction algorithm begins with performing the back projection operation. This operation is described by the following relation:

$$\tilde{\mu}_{i,j} = \Delta_\alpha^h \sum_\theta \bar{p}^h(\beta_{ij}, \alpha_\theta^h, \dot{z}_{ijp}), \tag{11}$$

wherein: $\tilde{\mu}_{i,j}$ is the image of a cross-section obtained after the back-projection operation at position $z_p$; $\alpha_\theta^h$ is an angle at which a given projection is carried out;

$$\frac{\alpha_p^h - \pi}{\Delta_\alpha^h} \le \theta \le \frac{\alpha_p^h + \pi}{\Delta_\alpha^h}$$

is the index of the projections used; $\bar{p}^h(\beta_{ij}, \alpha_\theta^h, z_{ijp})$ are the interpolated values of the projections at an angle $\alpha_\theta^h$ for voxel described by coordinates (i, j, $z_p$); i=1, 2, . . . , I; j=1, 2, . . . , I.

Projections $\bar{p}^h(\beta_{ij}, \alpha_\theta^h, \dot{z}_{ijp})$ are interpolated for all pixels (i, j) in reconstructed image at every angle $\alpha_\theta^h$ using the following interpolation formula:

$$\bar{p}^h(\beta_{ij}, \alpha_\theta^h, z_p) = \Delta_\beta \dot{\Delta}_z \sum_\eta \sum_k p^h(\beta_\eta, \alpha_\theta^h, \dot{z}_k) \cdot w_{ij,\eta} v_{uj,k}(\dot{z}_{ijp} - \dot{z}_k), \tag{12}$$

wherein weights are established in the following way:

$$w_{ij,\eta} = \text{Int}(\beta_{ij} - \beta_\eta) \tag{13}$$

and $$v_{ij,k} = \text{Int}(\dot{z}_{ijp} - \dot{z}_k) \tag{14}$$

wherein $$\beta_{ij} = \arctan \frac{i \cdot \Delta_s \cdot \cos\alpha_\theta^h + j \cdot \Delta_s \cdot \sin\alpha_\theta^h}{R_f + i \cdot \Delta_s \cdot \sin\alpha_\theta^h - j \cdot \Delta_s \cdot \cos\alpha_\theta^h} \tag{15}$$

is a projection of a voxel (i, j, $z_p$) on the screen at a given angle $\alpha_\theta^h$ for coordinate $\beta$, and $$\dot{z}_{ijp} = \frac{R_f \cdot (z_0 - z_p)}{R_f + i \cdot \Delta_s \cdot \sin\alpha_\theta^h - j \cdot \Delta_s \cdot \cos\alpha_\theta^h}, \tag{16}$$

is a projection of voxel (i, j, $z_p$) on screen at a given angle $\alpha_\theta^h$ for coordinate $\dot{z}$, and ($\eta$, k) are the indices of the detectors on the screen; $p^h(\beta_\eta, \alpha_\theta^h, \dot{z}_k)$ are projections obtained in the scanner. The interpolation function Int must be the same as was used in Step 1, in this application it is the ordinary linear interpolation function, which is expressed in the following way $$\text{Int}(\Delta\beta) = \begin{cases} \frac{1}{\Delta_\beta}\left(1 - \frac{|\Delta\beta|}{\Delta_\beta}\right) & \text{for } |\Delta\beta| \le \Delta_\beta \\ 0 & \text{for } |\Delta\beta| > \Delta_\beta \end{cases}, \tag{17}$$

and $$\text{Int}(\Delta\dot{z}) = \begin{cases} \frac{1}{\dot{\Delta}_z}\left(1 - \frac{|\Delta\dot{z}|}{\dot{\Delta}_z}\right) & \text{for } |\Delta\dot{z}| \le \dot{\Delta}_z \\ 0 & \text{for } |\Delta\dot{z}| > \dot{\Delta}_z \end{cases} \tag{18}$$

for $\beta$ and $\dot{z}$ dimensions, respectively.

Output for this step is an image $\tilde{\mu}_{i,j}$; i=1, 2, . . . , I; j=1, 2, . . . , I, i.e. an image obtained after the back-projection operation at position $z_p$.

Step 4.

After the back-projection operation, the calculation of the weight coefficients $g_{i,j}$ for all pixels in the reconstructed image is performed. This step is carried out according to the following equation:

$$g_{i,j} = \sqrt{\sum_\theta \sum_\eta \sum_k w_{ij,\eta}^2 v_{ij,k}^2 e^{p^h(\beta_\eta, \alpha_\theta^h, \dot{z}_k)}}, \tag{19}$$

wherein weights $w_{ij,\eta}$ and $v_{ij,k}$ are established according to the relations (13) and (14), respectively.

Output for this step is a matrix of weights $g_{i,j}$; i=1, 2, . . . , I; j=1, 2, . . . , I.

Step 5.

In this step, an initial image for the iterative reconstruction procedure is determined. It can be any image $\mu_{i,j}^0$ but for the accelerating of the reconstruction process it is determined using a standard reconstruction method based on projections $p^h(\beta_\eta, \alpha_\theta^h, \dot{z}_k)$ for instance a well-known Feldkamp-type method constructed for a spiral cone beam scanner, for example presented in [13] R. Cierniak, *X-Ray Computed Tomography in Biomedical Engineering*, Springer, London, 2011.

Output for this step is an initial reconstructed image $\mu_{i,j}^0$; i=1, 2, . . . , I; j=1, 2, . . . , I.

Step 6.

The reconstructed image $\mu_{i,j}^t$ can be processed using parameters $g_{i,j}$ and $H_{i,j}$ by the iterative reconstruction process being a sub-procedure of the reconstruction algorithm. As an initial for this sub-procedure image $\mu_{i,j}^0$ is used an image obtained in Step 5.

Output for this step is a reconstructed image $\mu_{i,j}^{t\_stop}$; i=1, 2, . . . , I; j=1, 2, . . . , I.

An image obtained in such a way is designated to present the image on screen for diagnostic interpretation using a different method of presentation developed for computed tomography.

Figure 10:
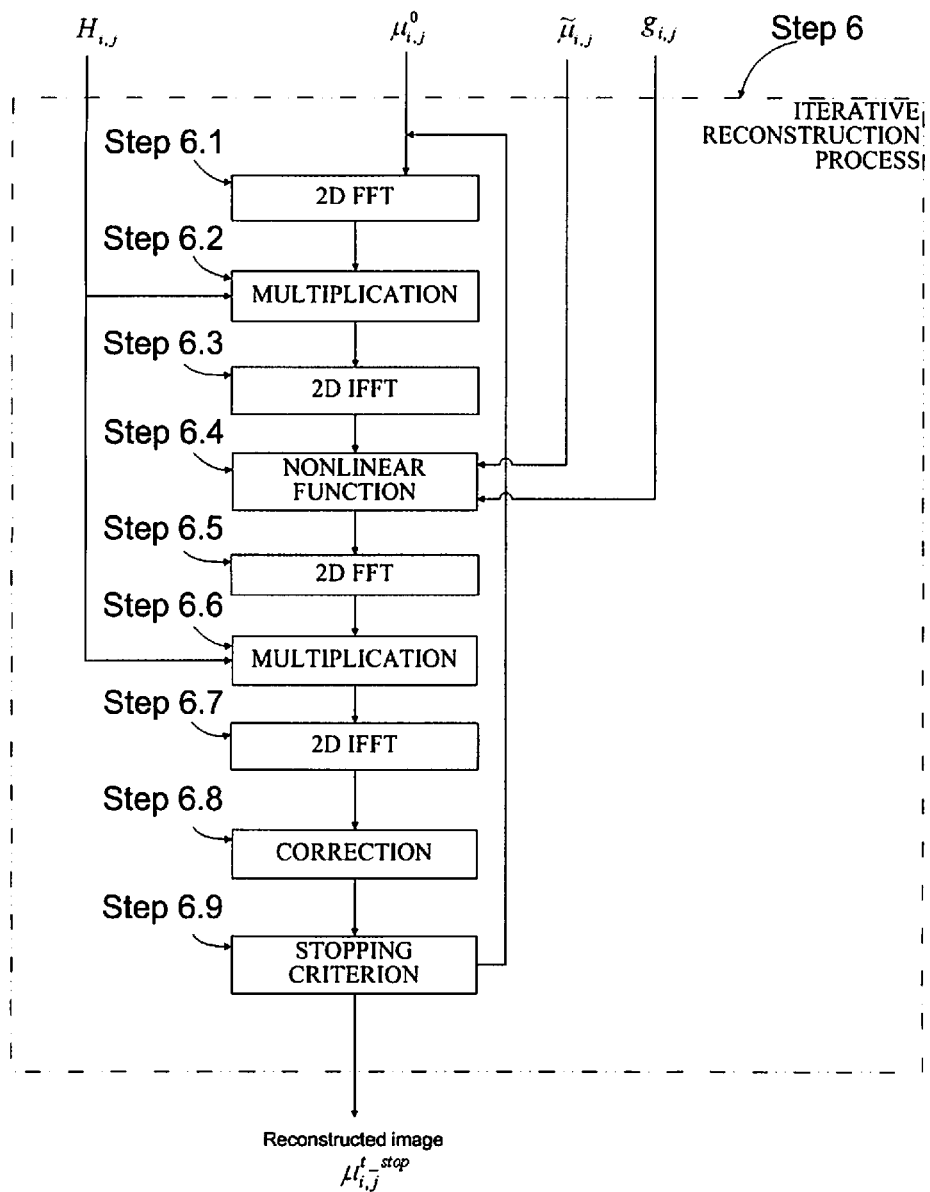
FIG. 10 depicts a schematic block diagram of an iterative reconstruction process.

The iterative reconstruction procedure performed in Step 6 consists of several sub-operations as presented in FIG. 10, as follows.

Step 6.1.

At the beginning of every iteration of this sub-procedure, the 2D FFT of the reconstructed image $\mu_{i,j}^t$ is performed. Of course, at the first iteration, the image $\mu_{i,j}^0$ is transformed.

If the reconstructed image has dimensions I×I then this frequency representation of this image $M_{k,l}^t$ has dimensions 2I×2I.

Step 6.2.

In this step, multiplication of every element of a matrix $M_{k,l}^t$ by a corresponding element of the matrix $H_{k,l}$ (obtained in Step 2) is carried out. This operation represents a convolution operation transformed to the frequency domain. This way, the number of necessary calculations is drastically reduced.

In the way of $4I^2$ multiplications, the matrix $A_{k,l}^t$ is obtained with dimensions 2I×2I.

Step 6.3.

In this step, the inverse 2D FFT of the matrix $A_{k,l}^t$ is performed.

If the matrix $A_{k,l}^t$ has dimensions 2I×2I then the spatial representation of this matrix $a_{i,j}^t$ has dimensions I×I.

Step 6.4.

In this step, all values $a_{i,j}^t$ are transformed by a nonlinear function, in the following way:

$$b_{i,j}^t = g_{i,j} \cdot \tanh\left(\frac{a_{i,j}^t - \tilde{\mu}_{i,j}}{\lambda}\right), \quad (20)$$

wherein $\lambda$ is a constant slope coefficient, and strongly depends on the reconstructed image dimensions; coefficients $g_{i,j}$ are obtained in Step 4.

A result of this operation is a matrix $b_{i,j}$ with dimensions I×I.

Step 6.5.

The 2D FFT of the matrix $b_{i,j}^t$ is performed.

If the reconstructed image has dimensions I×I then this frequency representation of this matrix $B_{k,l}^t$ has dimensions 2I×2I.

Step 6.6.

In this step, multiplication of every element of the matrix $B_{k,l}^t$ by a corresponding element of the matrix $H_{k,l}$ (obtained in Step 2) is carried out. This operation represents a convolution operation transformed to the frequency domain. This way, the number of necessary calculations is drastically reduced.

In the way of $4I^2$ multiplications, the matrix $C_{k,l}^t$ is obtained with dimensions 2I×2I.

Step 6.7.

In this step, the inverse 2D FFT of the matrix $C_{k,l}^t$ is performed, and the matrix $C_{i,j}^t$ in a spatial domain is obtained.

If the matrix $C_{k,l}^t$ has dimensions 2I×2I then the spatial representation of this matrix $c_{i,j}^t$ has dimensions I×I.

Step 6.8.

The correction operation is performed in this step, according to $$\mu_{i,j}^{t+1} = \mu_{i,j}^t - \rho \cdot c_{i,j}^t, \quad (21)$$

where $\rho$ is a constant coefficient.

Step 6.9.

In this step, it is decided whether the iterative process is continued or not. This decision can be made based on a subjective evaluation of the reconstructed image quality at this stage of the reconstruction process (quality of reconstructed image is satisfying). Alternatively, this reconstruction process can be stopped after an in advance established number of iterations.

If the reconstruction process is continued then an image $\mu_{i,j}^{t+1}$ is an input matrix (representing the reconstructed image) for the next iteration of the iterative reconstruction process 8, i.e. $\mu_{i,j}^t = \mu_{i,j}^{t+1}$, or if it is not continued then image $\mu_{i,j}^{t+1}$ is considered to be a final reconstructed image, i.e. $\mu_{i,j}^{t\_stop} = \mu_{i,j}^{t+1}$.

Figure 11:
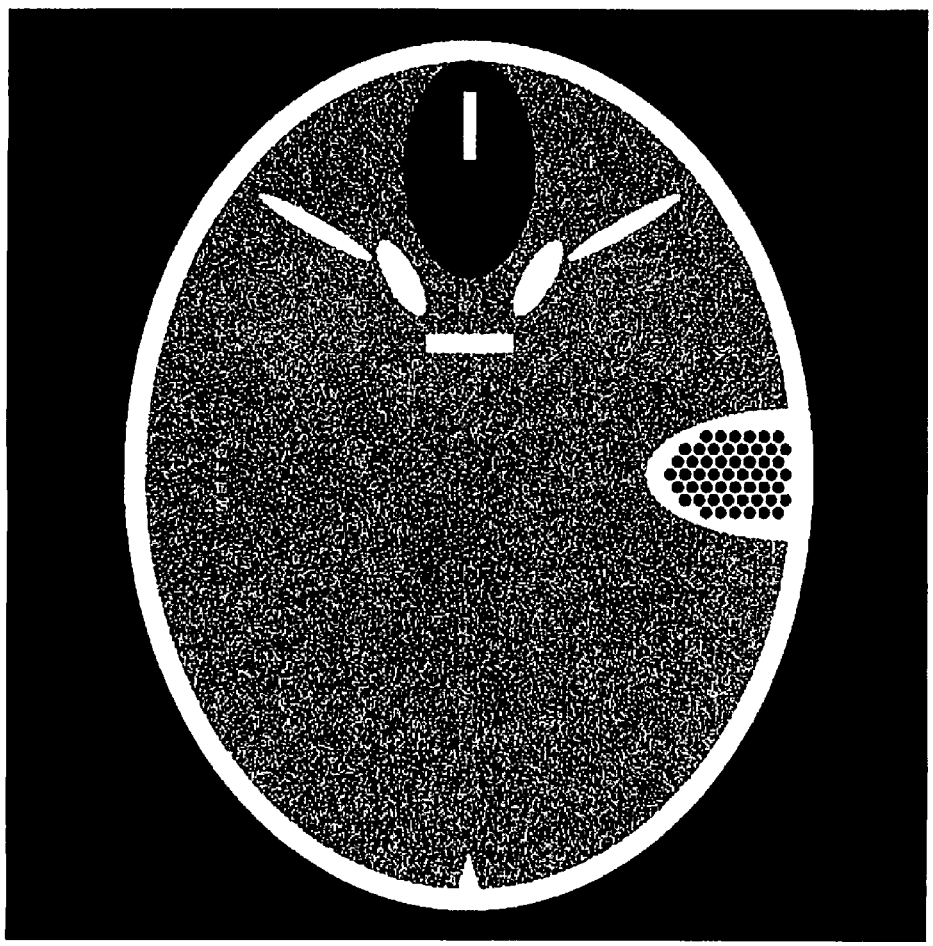
FIG. 11 is a prior art reconstructed image of a mathematical phantom using a Feldkamp-type reconstruction algorithm.
Figure 12:
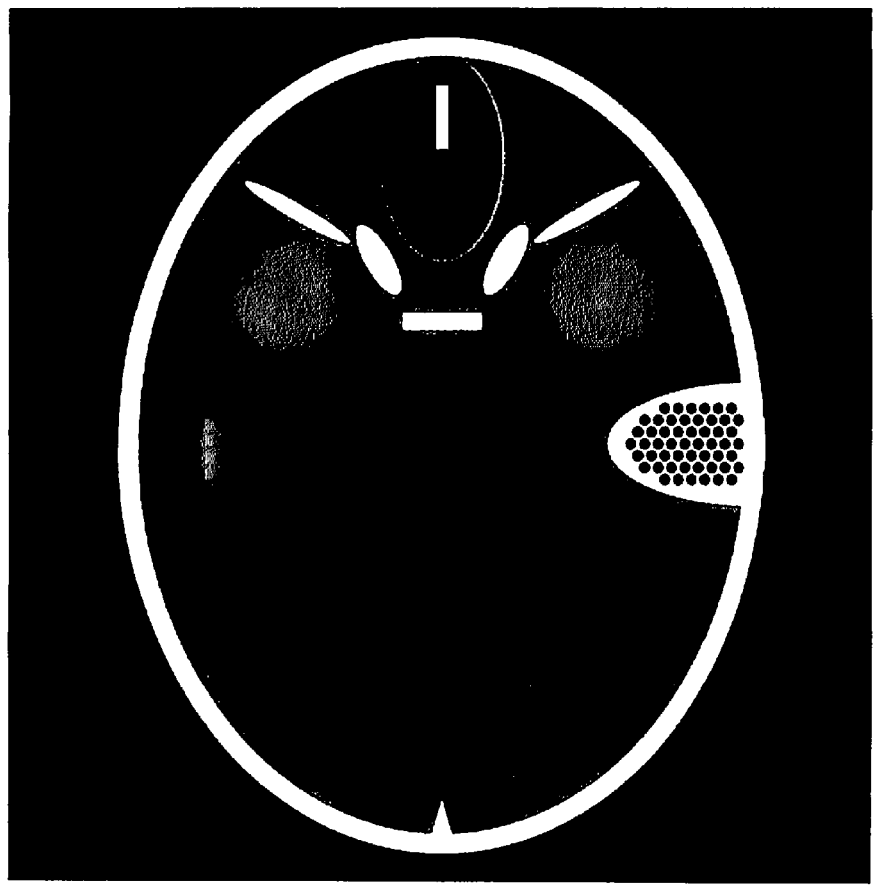
FIG. 12 is a reconstructed image of the mathematical phantom using the reconstruction method which embodies the presented invention.
Figure 13:
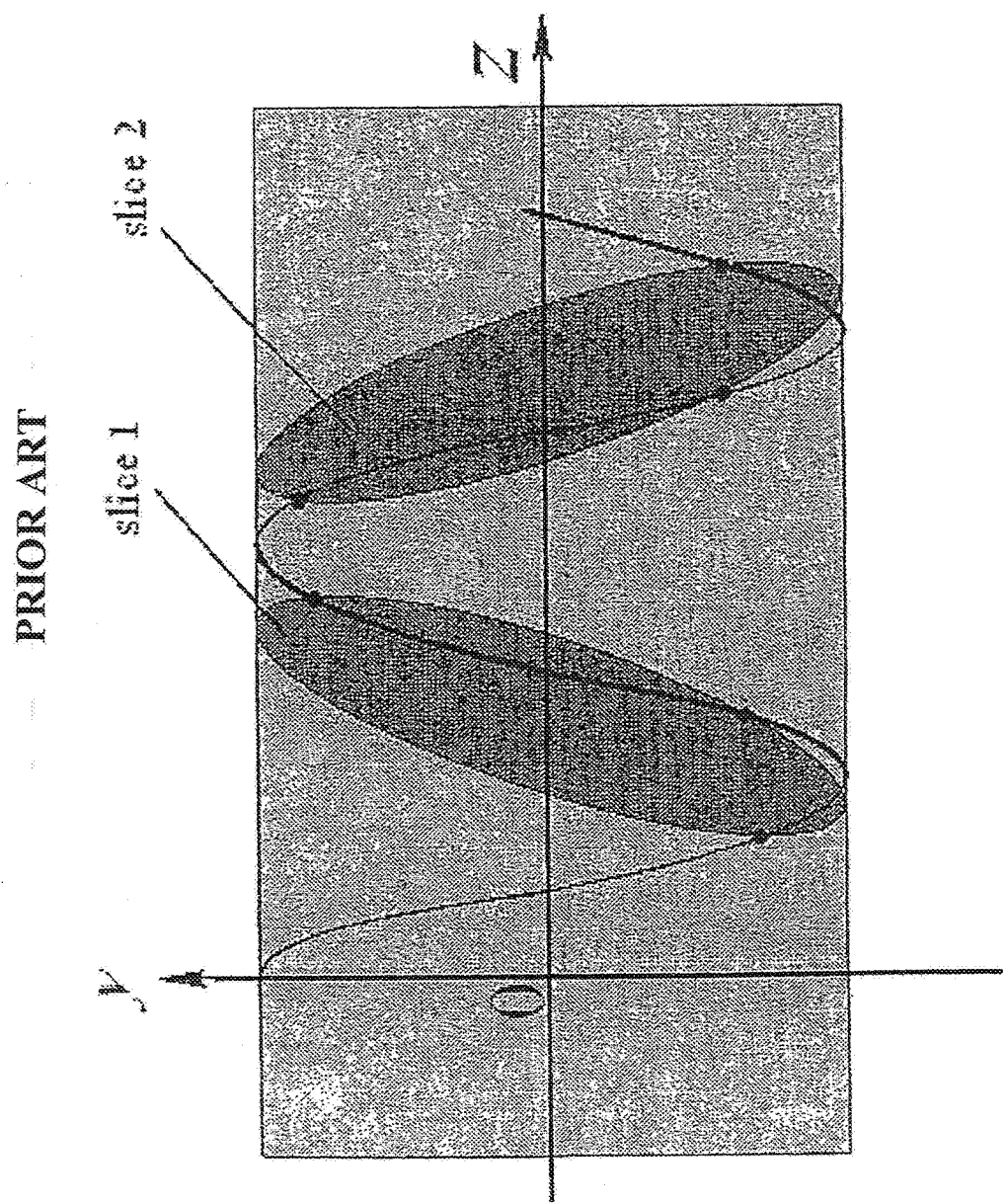
FIG. 13 shows a 3D nutating slice method.
Figure 14:
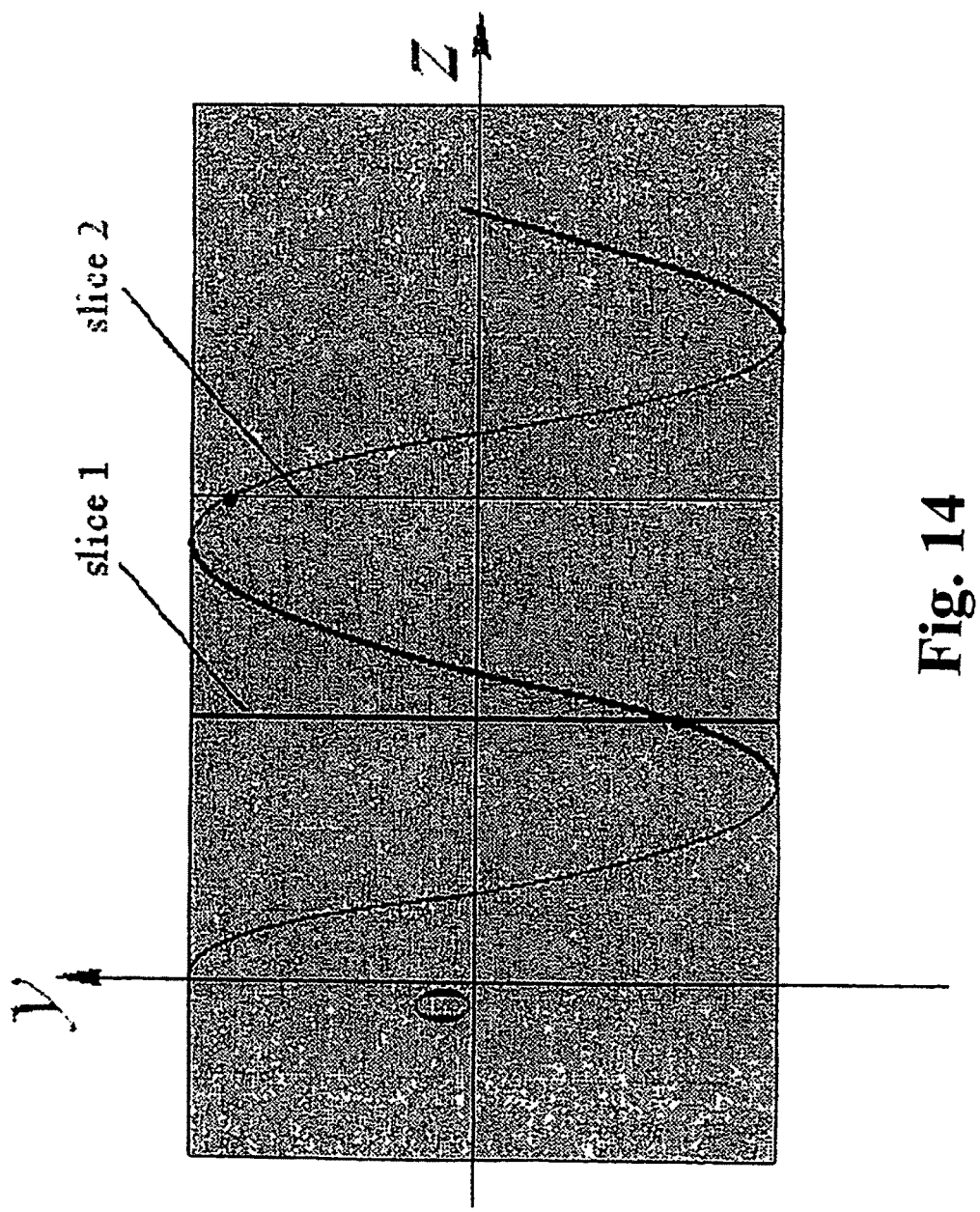
FIG. 14 shows a 3D method described in the present invention.

Using the image reconstruction method and apparatus to practice the presented invention, image artifacts and distortions are significantly reduced, as shown by the contrast between FIG. 11 and FIG. 12. In consequence, it allows to improve the resolution of the reconstructed images and/or to decrease the X-ray intensity at maintenance of quality of the obtained CT images, because this intensity is strongly related to the resolution of the obtained images. Furthermore, in contrast with the ICD approach, where the computational complexity of every iteration of the reconstruction procedure is approximately proportional to $I^4$×number of reconstructed images×number of used projection measurements, the application method is very attractive (feasible and giving high quality images) from the perspective of a 3D implementation, with a computational complexity of approximately $2I^2 \log_2 I$ for one iteration of the iterative reconstruction process.

What is claimed is:

1. A method of performing of an iterative reconstruction process, forming part of a method for reconstructing an image of an examined object using a spiral computed tomographic scanner, is carried out by a procedure comprising of:

performing of a 2D FFT of a reconstructed image $\mu_{i,j}^t$; a resulting matrix $M_{k,l}^t$ is a frequency representation of the reconstructed image $\mu_{i,j}^t$;

performing multiplication of elements of the resulting matrix $M_{k,l}^t$ which is obtained in a previous step of the iterative reconstruction process by corresponding elements of a matrix $H_{k,l}$; a resulting matrix $A_{k,l}^t$ is a frequency representation of a referential image $a_{k,l}^t$ for an image $\mu_{i,j}^t$ obtained after a back-projection operation;

performing of a 2D IFFT of the matrix $A_{k,l}^t$ obtained in a previous step of the iterative reconstruction process; a resulting matrix represents the referential image $a_{k,l}^t$ for the image $\mu_{i,j}^t$ obtained after the back-projection operation;

transforming, by a nonlinear function, of differences between corresponding pixels of a referential image $a_{k,l}^t$ obtained as a result of a previous step of the iterative reconstruction process and pixels of the image $\tilde{\mu}_{i,j}^t$ obtained after the back-projection operation; a resulting matrix is a matrix $b_{k,l}^t$;

performing of the 2D FFT of the matrix $b_{k,l}^t$ obtained in a previous step of the iterative reconstruction process; a resulting matrix $B_{k,l}^t$ is a frequency representation of the matrix $b_{k,l}^t$;

performing multiplication of elements of the matrix $B_{k,l}^t$ obtained in a previous step of the iterative reconstruction process by corresponding elements of a matrix $H_{k,l}$; a resulting matrix $C_{k,l}^t$ is a frequency representation of a matrix of corrections for the reconstructed image $\mu_{i,j}^t$;

performing of the 2D IFFT of the matrix $C_{k,l}^t$ obtained in a previous step of the iterative reconstruction process; a resulting matrix $c_{k,l}^t$ represents a matrix of corrections for the reconstructed image $\mu_{i,j}^t$;

performing a correction of the reconstructed image $\mu_{i,j}^t$;

using of a criterion of an iterative process for stopping.

2. The method in accordance with claim 1 further comprising orienting a plane;

placing an image in the plane by a coordinate system (x,y);

placing a topology of pixels in the reconstructed image $\mu_{i,j}^t$ according to the following description:

$$x = \ldots, -\frac{5\Delta_s}{2}, -\frac{3\Delta_s}{2}, -\frac{\Delta_s}{2}, \frac{\Delta_s}{2}, \frac{3\Delta_s}{2}, \frac{5\Delta_s}{2}, \ldots,$$

for an x direction, and $$y = \ldots, -\frac{5\Delta_s}{2}, -\frac{3\Delta_s}{2}, -\frac{\Delta_s}{2}, \frac{\Delta_s}{2}, \frac{3\Delta_s}{2}, \frac{5\Delta_s}{2}, \ldots$$

for a y direction, where $\Delta_s$ is a raster of pixels in the reconstructed image $\mu_{i,j}^t$, for both x and y directions.

3. The method in accordance with claim 1 wherein a transformation by a nonlinear function is performed using the following relation:

$$b_{i,j}^t = g_{i,j} \cdot \tanh\left(\frac{a_{i,j}^t - \tilde{\mu}_{i,j}}{\lambda}\right)$$

where i and j are indexes indicating coordinates pixels in the reconstructed image $\mu_{i,j}^t$ in x and y directions, respectively; $a_{i,j}^t$ is a pixel from a referential image for the image $\mu_{i,j}$ obtained after the back-projection operation; $b_{i,j}^t$ is a pixel from an image obtained after transformation of the pixel $a_{i,j}^t$; $g_{i,j}$ is a coefficient established for a given pixel indicated by indices i and j; $\tilde{\mu}_{i,j}$ is a pixel indicated by indices i and j in the image obtained after the back-projection operation based on non-filtered projections; $\lambda$ is a constant slope coefficient.

4. A method of performing of an iterative reconstruction process, forming part of a method of tomographic imaging, is carried out by steps comprising of:
  performing of a 2D FFT of a reconstructed image $\mu_{i,j}^t$; a resulting matrix $M_{k,l}^t$ is a frequency representation of the reconstructed image $\mu_{i,j}^t$;
  performing multiplication of elements of the resulting matrix $M_{k,l}^t$ which is obtained in a previous step of the iterative reconstruction process by corresponding elements of a matrix $H_{k,l}$; a resulting matrix $A_{k,l}^t$ is a frequency representation of a referential image $a_{k,l}^t$ for an image $\tilde{\mu}_{i,j}^t$ obtained after a back-projection operation;
  performing of a 2D IFFT of the matrix $A_{k,l}^t$ obtained in a previous step of the iterative reconstruction process; a resulting matrix represents the referential image $a_{k,l}^t$ for the image $\tilde{\mu}_{i,j}^t$ obtained after the back-projection operation;
  transforming, by a nonlinear or linear function, of differences between corresponding pixels of a referential image $a_{k,l}^t$ obtained as a result of a previous step of the iterative reconstruction process and pixels of the image $\tilde{\mu}_{i,j}^t$ obtained after the back-projection operation; a resulting matrix is a matrix $b_{k,l}^t$;
  performing of the 2D FFT of the matrix $b_{k,l}^t$ obtained in a previous step of the iterative reconstruction process; a resulting matrix $B_{k,l}^t$ is a frequency representation of the matrix $b_{k,l}^t$;
  performing multiplication of elements of the matrix $B_{k,l}^t$ obtained in a previous step of the iterative reconstruction process by corresponding elements of a matrix $H_{k,l}$; a resulting matrix $C_{k,l}^t$ is a frequency representation of a matrix of corrections for the reconstructed image $\mu_{i,j}^t$;
  performing of the 2D IFFT of the matrix $C_{k,l}^t$ obtained in a previous step of the iterative reconstruction process; a resulting matrix $c_{k,l}^t$ presents a matrix of corrections for the reconstructed image $\mu_{i,j}^t$;
  performing a correction of the reconstructed image $\mu_{i,j}^t$;
  using of a criterion of an iterative process for stopping.

5. The method in accordance with claim 4 further comprising:
  orienting a plane;
  placing an image in the plane by a coordinate system (x,y);
  placing a topology of pixels in the reconstructed image $\mu_{i,j}^t$ according to the following description:

$$x = \ldots, -\frac{5\Delta_s}{2}, -\frac{3\Delta_s}{2}, -\frac{\Delta_s}{2}, \frac{\Delta_s}{2}, \frac{3\Delta_s}{2}, \frac{5\Delta_s}{2}, \ldots,$$

for an x direction, and $$y = \ldots, -\frac{5\Delta_s}{2}, -\frac{3\Delta_s}{2}, -\frac{\Delta_s}{2}, \frac{\Delta_s}{2}, \frac{3\Delta_s}{2}, \frac{5\Delta_s}{2}, \ldots$$

for a y direction, where $\Delta_s$ is a raster of pixels in the reconstructed image $\mu_{i,j}^t$, for both x and y directions.

6. The method in accordance with claim 4 wherein a transformation by a nonlinear function is performed using the following relation:

$$b_{i,j}^t = g_{i,j} \cdot \tanh\left(\frac{a_{i,j}^t - \tilde{\mu}_{i,j}}{\lambda}\right)$$

where i and j are indexes indicating coordinates pixels in the reconstructed image $\mu_{i,j}^t$ in x and y directions, respectively; $a_{i,j}^t$ is a pixel from a referential image for the image $\mu_{i,j}$ obtained after the back-projection operation; $b_{i,j}^t$ is a pixel from an image obtained after transformation of the pixel $a_{i,j}^t$; $g_{i,j}$ is a coefficient established for a given pixel indicated by indices i and j; $\tilde{\mu}_{i,j}$ is a pixel indicated by indices i and j in the image obtained after the back-projection operation based on non-filtered projections; $\lambda$ is a constant slope coefficient.

* * * * *